United States Patent
Peterson et al.

(10) Patent No.: US 11,102,323 B1
(45) Date of Patent: Aug. 24, 2021

(54) NETWORK-INTEGRATED STORAGE DATA CACHE

(71) Applicant: EMC Corporation, Hopkinton, MA (US)

(72) Inventors: Ryan Peterson, Discovery Bay, CA (US); Brian Scott Cassell, Canyon Country, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 346 days.

(21) Appl. No.: 14/971,808

(22) Filed: Dec. 16, 2015

(51) Int. Cl.
*H04L 29/06* (2006.01)
*H04L 29/08* (2006.01)
*G06F 3/06* (2006.01)

(52) U.S. Cl.
CPC .......... *H04L 67/2842* (2013.01); *G06F 3/067* (2013.01); *G06F 3/0613* (2013.01); *G06F 3/0656* (2013.01)

(58) Field of Classification Search
CPC ....................................................... H04L 29/06
USPC ......................................................... 709/219
See application file for complete search history.

(56) References Cited

U.S. PATENT DOCUMENTS

| | | | |
|---|---|---|---|
| 2004/0122888 A1* | 6/2004 | Carmichael | H04L 12/2801 709/200 |
| 2004/0190845 A1* | 9/2004 | Chen | H04Q 11/0005 385/122 |
| 2015/0067229 A1* | 3/2015 | Connor | G06F 13/4022 710/317 |
| 2016/0149835 A1* | 5/2016 | Ikarashi | H04L 49/555 370/389 |

* cited by examiner

*Primary Examiner* — Sibte H Bukhari
(74) *Attorney, Agent, or Firm* — Workman Nydegger

(57) ABSTRACT

In one example, a switch in the form of a network core switch includes one or more card slots. A cache memory device is also included that is configured to be received in one of the card slots. The switch further includes one or more storage node connection ports in communication with the cache memory device, and also includes one or more client communication ports in communication with the cache memory device.

12 Claims, 6 Drawing Sheets

NETWORK-INTEGRATED STORAGE DATA CACHE

FIELD OF THE INVENTION

Embodiments of the present invention generally concern data retention within networking devices. More particularly, at least some embodiments of the invention relate to systems, hardware, computer-readable media, and methods directed to network-based file, object blobs, and other similar data system caching.

BACKGROUND

As the sophistication and power of computing systems, components and applications continues to increase, the size of files and data objects, associated with such computing systems, components and applications has correspondingly increased as well. For example, multi-media files such as high-resolution video, can be quite large, such as in the case where a video may have a length measured in hours. Audio files, and computer aided design (CAD) files can also be relatively large. As well, a grouping of files, such as a file structure for example, can be quite large in size, even where none of the files in the grouping is particularly large.

It is in the nature of at least some of these types of file and data objects that the way in which they are made available to a user can have a significant negative impact on the utility of the file and data object, and on the user experience. For example, if a user is streaming a video, it is important that the feed from the source to the user be fast and consistent. Otherwise, the video may run slowly and/or appear choppy to the user, resulting in an unsatisfactory user experience. As another example, files and data objects commonly used by a computer user require higher performance access than those used less frequently.

The present solutions to problems such as those noted above include connecting file and object storage medium to the networking devices through traditional networking methods. Those attempts have not been successful in some regards. For example, some enterprises have used so-called cache boxes to try to improve performance. The memory capacity of the cache box enables the storage of large files and groups of files. In terms of configuration and accessibility, a cache box has an associated IP address and requests directed to the cache box must first pass through a network interface before they can be serviced.

If content is already stored in the cache box, a user may be able to access that content relatively quickly. However, because the cache box is only accessible through a network client interface, servicing the user request for content degrades network performance. This problem becomes more acute as the number of users, and the amount of content accessed, increases. All of the file access gets constricted through the network interface between the network devices and the connected file storage medium.

In light of problems such as those noted above, it would be useful to provide systems, methods and devices capable of caching relatively large amounts of data that can be accessed by multiple users and from many concurrent sources and interfaces. It would also be useful to enable access to the cached file and data objects without the need for multiple users data requests to pass through a storage device network interface to retrieve the requested file or data object. It would also be useful to provide systems, methods and devices that can provide relatively high data rates to a user, or group of users, without significantly impairing network performance. Finally, it would be useful to push content out to the cache prior to that content being requested by the user.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1A:
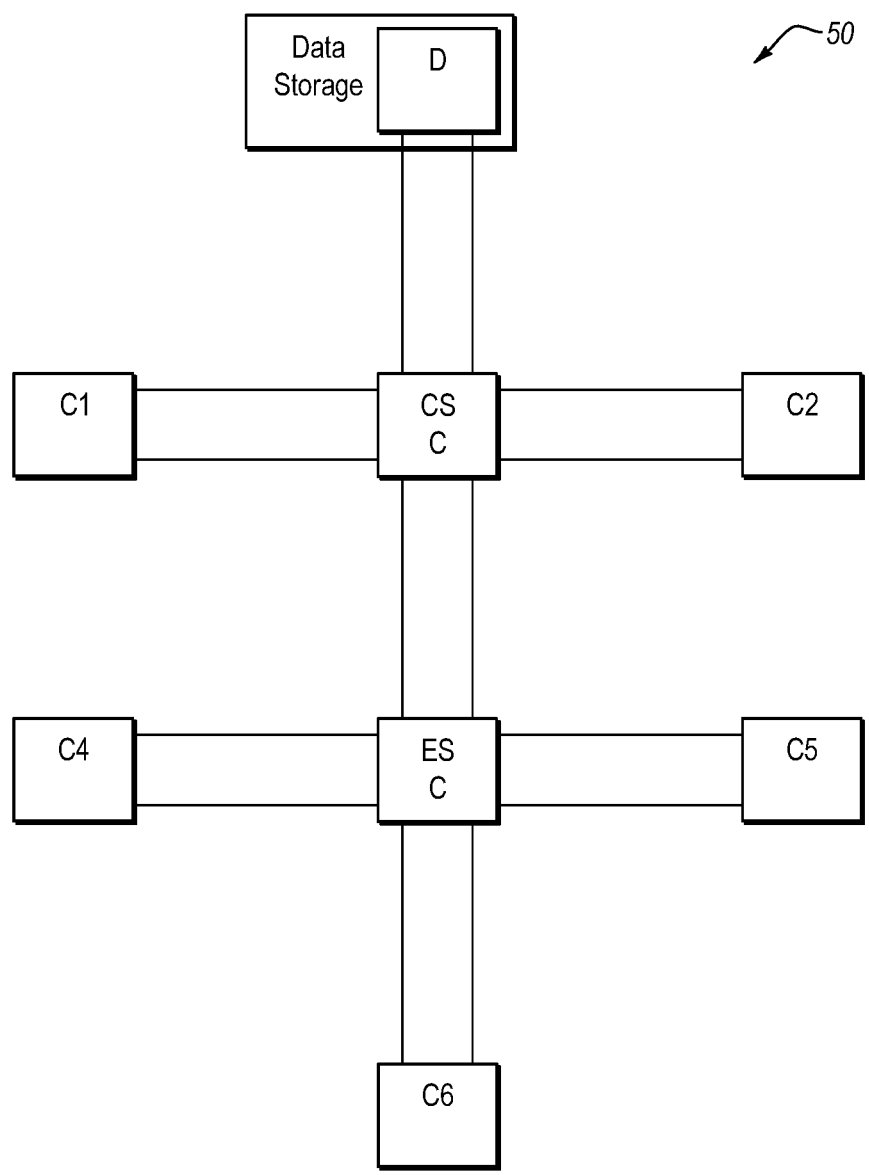
FIG. 1a is directed to a high level conceptual illustration of some example use cases.

Embodiments of the present invention generally concern systems, hardware, computer-readable media, and methods directed to the implementation and use of a network-integrated cache. The network-integrated cache can store any type of data. As used herein, the term 'data' is intended to be construed broadly and includes, by way of example and not limitation, data blocks, atomic data, chunks, segments, emails, objects, files, file structures, directories, volumes, and any group of one or more of the foregoing. The data can be of any type, and the scope of the invention is not limited to any particular type, or types, of data. In some cases, the data can be video, although that is not required. The data can be provided from the network-integrated cache to a user, or a group of users, by a variety of mechanisms, one example of which is streaming. In general, embodiments of the invention are directed to systems, devices, methods and software that provide for network-integrated caching which enables a user request for cached data to be serviced outside of the network. In at least some embodiments, a device such as a switch or core network card slot for example, is provided that includes adequate memory to store relatively large amounts of data. Because a user request for that data does not have to pass into or through a network interface, the data can be accessed very quickly by the user. In other embodiments, a group of such devices can be provided.

In one particular example embodiment, a network core switch and one or more memory nodes are provided. The network core switch may have a data throughput capability which can be in the terabits/second (Tbps) range in some cases, although network core switches, or comparable devices, with more or less data throughput capability can be employed in other embodiments. The network core switch can be part of a core fabric that is directly accessible by one or more clients.

Each memory node may reside in a respective slot of the network core switch. The memory nodes, which may sometimes be referred to as accelerator nodes, include large capacity cache memory, or random access memory (RAM), that can be read quickly. In some instances, the memory in one or more of the memory nodes consists of RAM, with no other memory provided. While embodiments of the invention are not limited to any particular amount of RAM, at least one particular embodiment of a memory node included in a network core switch includes 256 GB of RAM. More, or less, RAM can be used in other memory nodes and/or in other embodiments.

In operation, a user data request is generated at a client machine and transmitted to a network core switch. The user data request may relate to any type and/or amount of data and, in one particular example, takes the form of a request to stream stored video content. The client machine and network core switch are arranged such that there are no network interfaces in the path between the client machine and the network core switch. Thus, the data request does not pass into a network interface before reaching the network core switch, although the network core switch may be in communication with a network.

Upon receipt of the user data request, the network core switch reads the requested data from cache memory and returns the requested data to the user. The cache memory can be part of the network core switch itself and/or can be provided in the form of one or more core network cards and/or memory nodes positioned in corresponding slots of the network core switch. In some embodiments, the process of returning the requested data involves streaming the requested data from the cache memory to the user.

In one particular embodiment, the data requested by the user is pushed from a location, such as a network storage node for example, out to the network core switch prior to the transmission of the user request. Thus, in this example embodiment, the requested data is already resident in the cache at the network core switch when the data request is received from the user. In another example embodiment, the requested data is pulled from network storage, which may comprise cache memory, by the network core switch upon receipt of the user data request. The data is then cached at the network core switch, and read out in response to a user data request. Subsequent user requests for the same data can be serviced quickly since the requested data is already in the cache at the network core switch.

Advantageously then, embodiments of the invention provide for storing data in cache memory of a network core switch or other device of comparable performance. The network core switch is located and configured such that a user request for data located at the network core switch can be serviced directly at the network core switch, rather than at, or in, a network. Thus, the user data request need not pass into a network interface or enter a network. As a result, servicing of the data request does not materially impair network performance. Further, because the network core switch is capable of high data transfer rates, and employs cache memory to service user data requests, relatively large volumes of data can be provided quickly to a user or group of users. This type of performance is useful in applications such as, but not limited to, streaming of video content to multiple users simultaneously, or in parallel data streams that overlap, in time, to some extent.

A. Example Operating Environments

In general, embodiments of the invention may include and/or be implemented in an operating environment that includes various clients and/or other devices from which data requests can be transmitted. These clients and devices can communicate with one or more switches at which data is stored. The clients, devices, and switches may also communicate with, or be part of, a network, but data requests transmitted from clients and devices to the switch(es) do not have to pass into the network, although they may in some instances. Data from the network can be pushed to the switches and/or pulled down from the switches.

With reference first to FIG. 1a, some example use cases are indicated with reference to an operating environment 50. In general, FIG. 1a discloses some examples of how data (D) can reside in the network attached data storage device, such as Isilon for example, as well as closer to the client (Cn) within the various network switches. For example, when either requested by a client (C1 or C6 as examples) or pushed by a rule, the data is retained by the cache in either the core switch (CS) or the edge switch (ES) which has the cache (C) installed. One benefit of having cache in the edge switch, is that the cache is relatively close to the client C and thus will not need to traverse switch interconnects. Further if the data in the edge switch cache expires or is purged, that data can be refreshed via the data in the cache of the core switch.

Figure 1B:
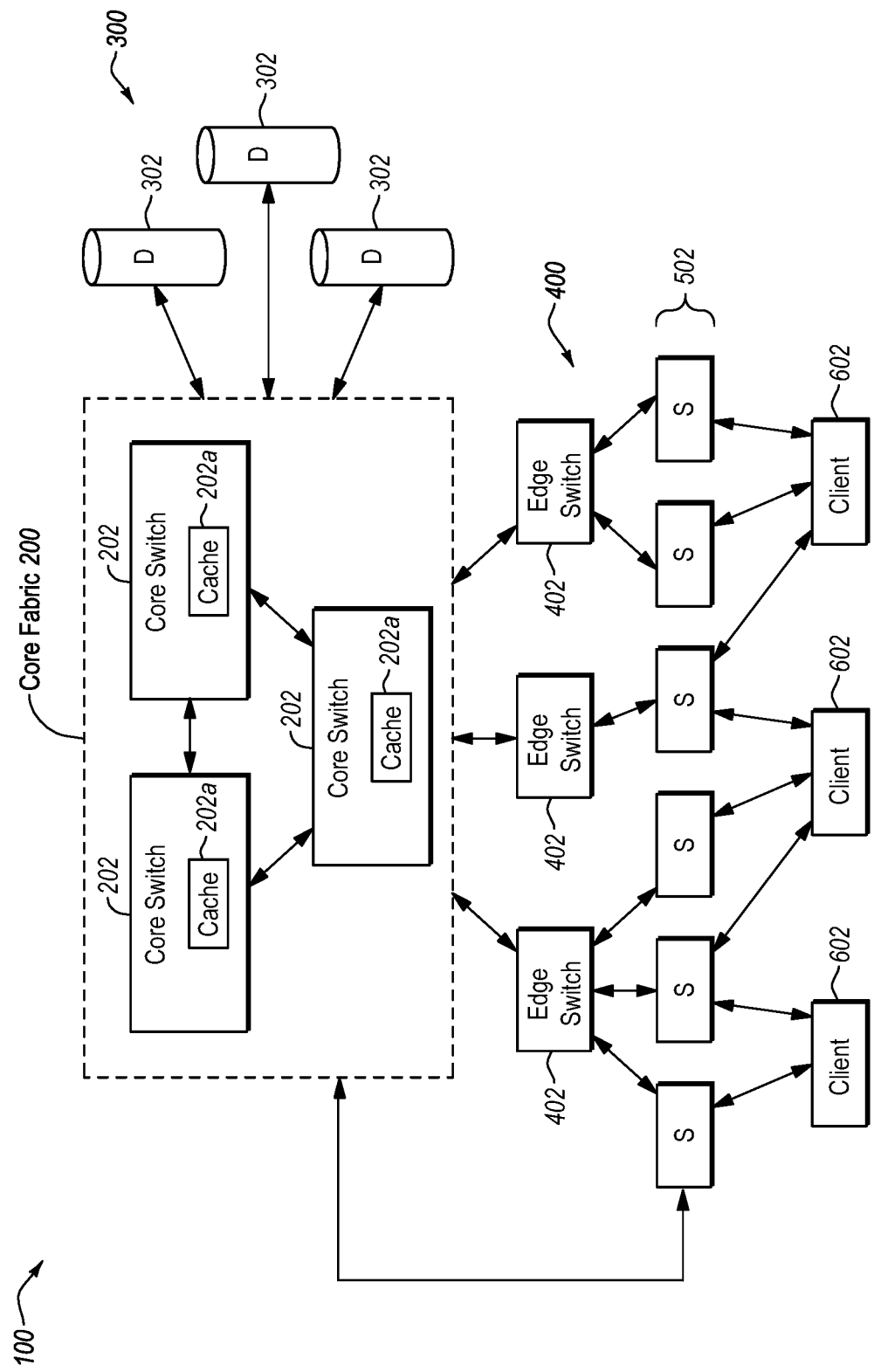
FIG. 1b is directed to aspects of an example operating environment for at least some embodiments.

With the foregoing in mind, attention is directed now to FIG. 1b which discloses one example of an operating environment that may be suitable for one or more embodiments of the invention. In FIG. 1b, the example operating environment is denoted at 100 and may be a network such as a local area network, a wide area network, or any other networked configuration. Moreover, the operating environment 100, or any group of one or more of its elements, may comprise, form an element of, or constitute, a cloud computing environment. The operating environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1b, the example operating environment 100 includes a core fabric 200 that includes a plurality of interconnected core switches 202 that are configured to communicate with each other. One or more of the core switches 202 includes cache memory 202a, such as RAM for example. In one particular embodiment, a cache memory 202a includes 256 GB of RAM, although more, or less, RAM could be included in any particular core switch 202. In some embodiments, one or more core switches 202 include only RAM, and no other memory and no spinning disks, although such a configuration is not required.

The operating environment 100 may also include one or more storage nodes 300 that have one or more datastores 302. The datastores 302 are accessible by the core switches 202 of the core fabric 200. As discussed in more detail elsewhere herein, data can be pushed from the storage node 300 to one or more of the core switches 202 and/or one or more of the core switches 202 can pull data from the storage node 300. Part, or all, of the storage node 300 can take the form of a distributed filesystem platform, such as an Isilon, ECS, or other storage cluster, although no particular form of implementation of the storage node 300, or its constituent components, is required.

The Isilon cluster is configured to provide high-volume storage, backup and archiving of unstructured data. In brief, the Isilon cluster can provide a cluster-based storage array based on industry standard hardware, and is scalable to 50 petabytes in a single filesystem. In some embodiments at least, the Isilon clustered storage system is composed of three or more nodes. Each node can be a self-contained, rack-mountable device that contains industry standard hardware, including disk drives, CPU, memory and network interfaces, and is integrated with an operating system software which unifies a cluster of nodes into a single shared resource. Depending upon the configuration, the Isilon hardware platform can include a variety of different nodes, such as S-Series nodes (for high-performance, process-intensive, high-transaction applications), the X-Series nodes (for high-throughput and high-concurrency application needs), the NL-Series nearline storage nodes (for archiving, disaster recovery and disk-to-disk backup needs); and, the HD-Series nodes (for large-scale, high-density deep archive storage needs, as well as disaster recovery).

With continued reference to FIG. 1b, the operating environment 100 can include a network edge configuration 400 that includes a plurality of edge switches 402. In general, the edge switches 402 can provide a mechanism for one or more servers 502 to access, indirectly, the core fabric 200. As suggested in the discussion of FIG. 1a, the edge switch 402 can possess the same cache technology as the core switches 202 to further reduce the hops that the data needs to go to be retrieved. Enabling both the core switch 202 and edge switch 402 environments would benefit the data speed and user experience. The servers 502 can host a variety of applications, including backup and restore applications. In particular, the servers 502 may provide various services to one or more clients 602. As well, the clients 602 can indirectly access data in the storage node 300 by way of the servers 502 and edge switches 402.

Although, as noted above, clients 602 can access data in the storage node 300 by way of the network edge configuration 400, that approach may not be well suited for all circumstances. For example, when the data set requested by a client 602 from the storage node 300 is relatively large, such as a video file for example, the speed at which the file is provided to the client 602 can be affected by, and affect, other network operations. With reference to the streaming video example, this may result in uneven playback for the user. Even if the video is preloaded to a cache or server, the preloading process involves the use of network assets and, as such, can have a negative impact on network operations and performance.

Thus, and with continued reference to FIG. 1b, at least some embodiments of the invention provide for systems, devices, software and configurations which enable one or more servers 502 to directly access one or more core switches 202 of the core fabric 200. As a result of this configuration, one or more of the servers 502 can access client-requested data stored in the caches 202a of one or more of the core switches 202, while bypassing the network interfaces and ports that might otherwise be used by the servers 502 to gain access to data from the storage node 300.

In more detail, data in the storage node 300 can be pulled by the core switch 202 and cached in the cache memory 202a in response to a client 602 data request. Additionally, or alternatively, data in the storage node 300 can be pushed from the storage node 300 to the cache memory 202a prior to any client 602 request for that data. In any case, when the requested data is present in the cache memory 202a, that data can be provided quickly by a server 502 to the requesting client 602 by virtue of the direct connection between the server 502 and core fabric 200, and by virtue of the use of cache memory 202a which can be accessed and read significantly faster than other types of memory.

B. Example Switches with Cache Memory

Figure 2:
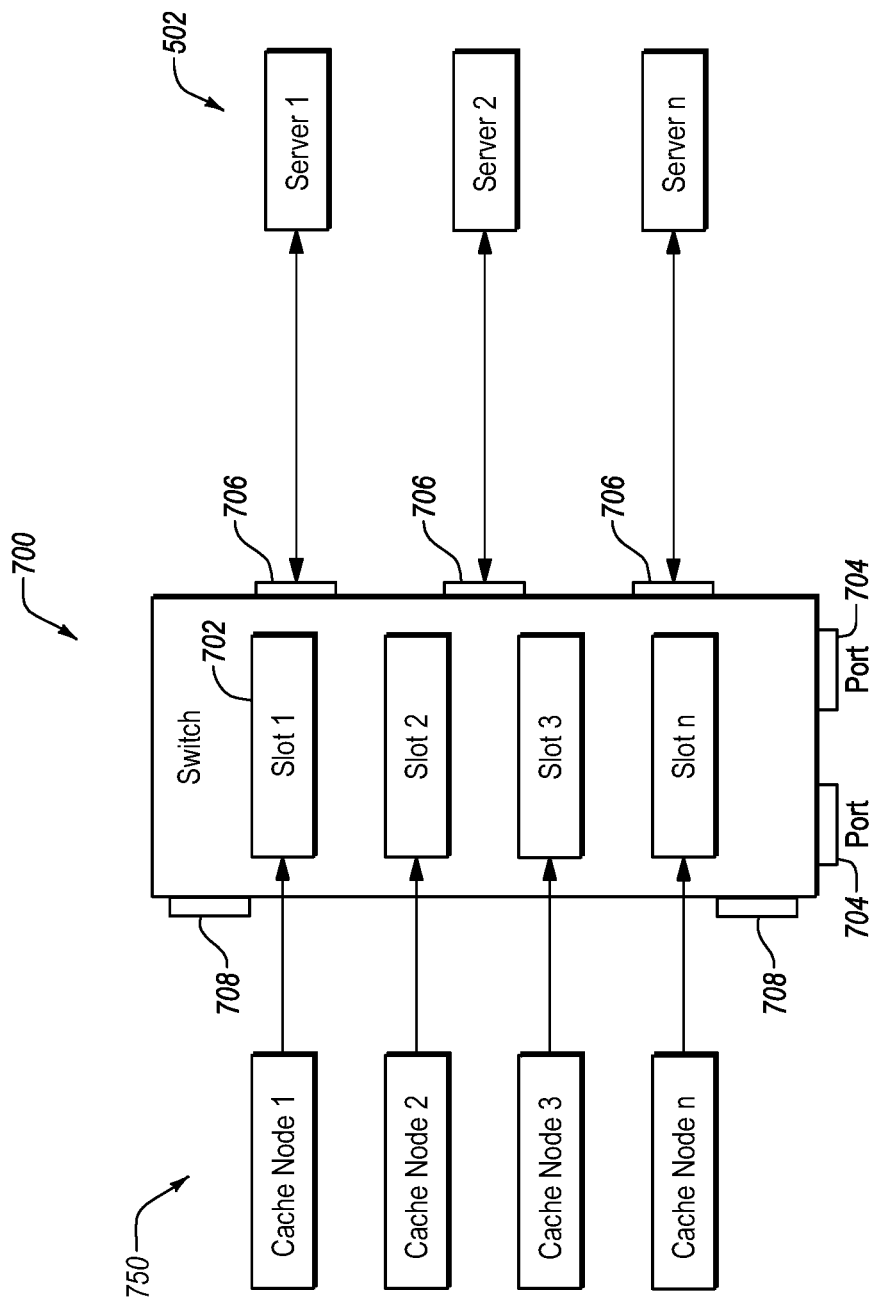
FIG. 2 is directed to aspects of an example switch that includes cache memory.

With reference now to FIG. 2, and continued reference to FIG. 1b, details are provided concerning example embodiments of a switch, such as a core switch. One such example is denoted generally at 700 in FIG. 2. In the illustrated example, the switch 700 is configured to communicate with one or more clients 602 and includes 'n' slots 702, where n is equal to or greater than 1, each of which is configured to receive a corresponding cache memory node 750. The slots 702 may each have a unique Internet Protocol (IP) address and, as such are accessible by network entities such at the storage node 300 and servers 502. The cache memory nodes 750 can all have the same memory capacity, but that is not required, and in some embodiments, one of the cache memory nodes has a different capacity than another of the cache memory nodes. The example switch 700 can also include one or more ports 704 configured to connect the switch with one or more storage nodes. As well, the switch 700 may further include one or more client communication ports 706 that enable communication between the switch 700 and one or more clients. Finally, the switch 700 can include switch fabric ports 708 that enable communication between the switch 700 and one or more other switches of a core fabric. In at least one embodiment, the switch fabric ports 708 are configured for use with InfiniBand traffic, although other configurations can alternatively be employed, including Ethernet configurations.

It will be appreciated that the switch 700, which can be a core switch, can be implemented in a variety of ways and, accordingly, the scope of the invention is not limited to any particular implementation. In at least one example embodiment, the switch 700 may be employed as a core switch and takes the form of a Force10 switch manufactured by Dell Computers. One such switch (such as the C7000 chassis-based switch, for example) may have any combination of the following characteristics, among others: MAC addresses—256K; IPv4/IPv6 routes—12K/6K; switching fabric capacity—768 Gbps (476 Mpps) or 1.536 Tbps (952 Mpps); link aggregation—8 links per group, 128 groups per chassis; queues per port—4 queues; VLANs—1024 VLANs with 4096 tag value support; Line-rate Layer 2 switching—all protocols, including IPv4 and IPv6; Line-rate Layer 3 routing—IPv4 and IPv6; LAG load balancing—based on Layer 2, IPv4 or IPv6 headers; and, switching latency—<5 µs for 64 byte frames. The ports of this example switch can be configured to communicate with an Isilon, ECS, or other storage cluster. One of ordinary skill in the art will appreciate that switches of other characteristics can alternatively be employed, and that any one or more of the aforementioned characteristics may be modified.

As noted above, one or more of the 'n' slots of the switch 700 can receive a corresponding cache memory node 750. In some example embodiments, one or more of the cache memory nodes 750 takes the form of an Isilon A100 Performance Accelerator. Such a cache node may have memory that consists of cache memory, and no spinning disks. This component may have any combination of the following characteristics, among others: connectivity—10 GB Ethernet×2 (optical fiber or copper), 1 GB Ethernet×4 (copper); memory—256 GB RAM; and, intracluster networking—2 QDR Infiniband connections. One of ordinary skill in the art will appreciate that cache nodes of other characteristics can alternatively be employed, and that any one or more of the aforementioned characteristics may be modified. Moreover, cache memory nodes 750 of different respective characteristics can be combined in a single switch 700 while, in other embodiments, a switch 700 may include cache nodes that are substantially similar or identical to each other.

C. Example Systems and Methods—Data Caching

Figure 3:
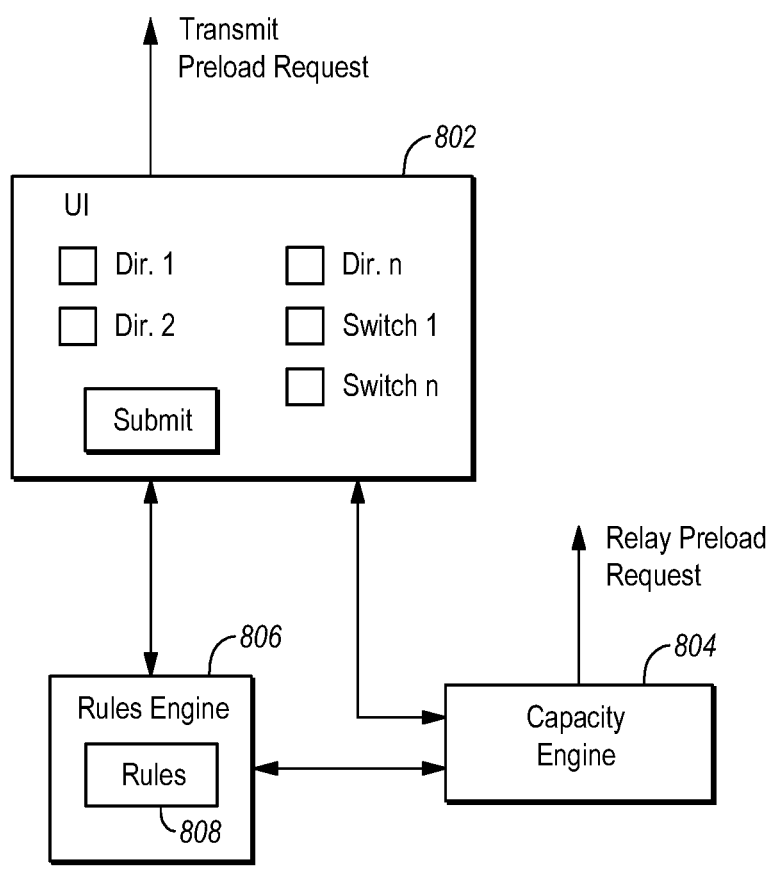
FIG. 3 is a block diagram of various example entities that may be involved in defining and servicing a data request.

With reference now to FIG. 3, details are provided concerning various additional components that may be involved in the caching of data at a switch. The example arrangement disclosed in FIG. 3 includes a user interface (UI) 802, which may be in the form of a graphical user interface (GUI). The UI 802 may be presented to a user at one or more of the clients 602 (FIG. 1b). Among other things, the UI 802 enables a user, such as an administrator for example, to specify data that is to be cached at one or more switches, such as core switches 202 (FIG. 1b). The data can be cached at one or more of the switches in anticipation of a user data request, sent from one or more clients 602 for example, for data residing at a storage node, such as storage node 300 (FIG. 1b). Such caching prior to issuance of a user data request may be referred to herein as a cache preload process. The preload process can be performed automatically on a specified date and time, or in response to occurrence, or the non-occurrence, of one or more events. Alternatively, a preload process can be performed upon initiation by a user, such as an administrator, at an interface on a server 502.

As indicated in the example UI 802, a user can specify which directory, or directories, are to be preloaded. As well, the user can specify which switch, or switches, should receive the selected directory(ies). Both directory selection and switch selection can be made by simply checking a box, although other mechanisms can alternatively be used to enable a user to make such selections, such as a command line interface (CLI) for example. While the example UI 802 indicates that a user can select an entire directory for preload to a cache, the scope of the invention is not limited in that regard. Rather, a user can specify data for preload at any level of granularity, examples of which include the sub-directory level, and file level. The data and switches selected by the user can collectively define a preload request, although additional and/or other information can be used to define a preload request.

With continued reference to FIG. 3, the UI 802 can communicate directly and/or indirectly with a capacity engine 804. In some embodiments, the capacity engine 804 can reside at a client 602, or at a storage node 300. More generally, however, the scope of the invention is not limited to any particular location for the capacity engine 804. In terms of its operation, the capacity engine 804 evaluates the preload request in view of the amount of cache capacity available at a particular switch. The capacity engine 804 can request cache capacity information from the switch and/or the switch can push capacity information to the capacity engine 804 whenever a change in capacity occurs at that switch.

In more detail, the capacity engine 804 can receive operational inputs from the UI 802, where the operational inputs can include the amount of data to be preloaded to a particular switch, or group of switches. The amount of data to be preloaded can be readily derived based on the boxes of the UI 802 that are checked by the user. When the user submits a preload request, which can include the size and name of one or more datasets, such as a directory for example, and which can also include the destination cache(s), the preload request can be transmitted to the capacity engine 804. The preload request may identify the amount of data to be preloaded or, alternatively, the capacity engine 804 can use the list of identified directories, for example, to obtain the data amount information from a storage node where the identified data is stored.

As noted earlier, another operational input to the capacity engine 804, or determinable by the capacity engine 804, is the amount of cache capacity available at the target switch(es) where the user identified data is targeted to be stored. With information concerning the amount of data to be stored, and information concerning the cache capacity available, the capacity engine 804 can then determine if a preload request can be carried out or not. If there is adequate cache capacity to service the preload request, the preload request can be carried out automatically, or upon confirmation by a user using the UI 802. For example, the preload request can be relayed from the capacity engine 804 to the affected switch(es) and/or a storage node. Alternatively, the preload request may be sent from a client 602, upon initiative of a user, to the affected switch(es) and/or a storage node.

On the other hand, if the available cache capacity is inadequate to service the preload request, the capacity engine 804 can transmit a message to the user, such as by way of the UI 802 for example, indicating that the preload request will not be carried out. The message from the capacity engine 804 may also specify the reason(s) why the preload request will not be carried out, for example, because there is inadequate cache capacity to service the preload request.

With continued reference to FIG. 3, at least some embodiments provide for a rules engine 806, which can receive operational inputs from the capacity engine 804, such as the assessment of the capacity engine 804 as to whether or not adequate cache space exists for a requested preload operation. The rules engine 806 can include and execute any rule(s) 808 relating to a preload request. In one particular embodiment, the rules engine 806 includes rules 808 that specify, for example, what act(s) may be performed if available cache capacity is exhausted before the data identified in the preload request can be completed loaded into the cache. As this suggests, a preload embodied in a preload request may still be performed, notwithstanding that the capacity engine 804 may have provided an indication that there is a lack of adequate cache capacity for the requested preload operation. Thus, in some circumstances at least, the rules engine 806 can override determinations made by the capacity engine 804.

Rules can also be employed that embody a prioritization scheme if the cache of a target card slot is insufficient to support a preload process. In one example, a rule may provide that if one cache lacks adequate capacity, the data of the preload request should be directed to another cache, which can be identified by its IP address. Rules can also be used to prioritize the caching of content. For example, if a preload process identifies an amount of data greater than the capacity that is available in any of the caches, a prioritization rule can be used to determine which subset of the identified data will be cached, and where, and which data of the identified data will not be cached. Additionally, a rule can be provided that specifies that when cache capacity becomes available, the lower priority data identified in the preload process will then be preloaded to the newly available cache.

A variety of rules 808 can be employed. One example rule provides that the maximum number of directories that can be loaded into the cache be loaded, with the remaining directories either not loaded, or loaded in a different cache. In variations of this rule, the maximum number of subdirectories, or files, can be loaded, and remaining subdirectories, or files, either not loaded or loaded in a different location. This rule can also be performed with respect to, for example, any other variables including, but not limited to, directory type, file type, and/or file size. The rules engine 806 can enable preload processes to be performed automatically, in accordance with any applicable rules, and/or can allow a user to specify, such as by way of the UI 802 for example, to decide whether or not to proceed with a requested preload operation.

It should be noted that FIG. 3 discloses only one example arrangement of a UI, capacity engine, and rules engine, and as such, FIG. 3 is not intended to limit the scope of the invention in any way. Moreover, various functionalities of the illustrated entities can be combined in ways other than shown. For example, in one embodiment, the capacity engine and rules engine can be combined into a single entity. As well, the entities disclosed in FIG. 3 can reside at any suitable location, including those shown in FIG. 1*b*, in a network environment and are not required to reside in any particular place, device, or domain.

Figure 4:
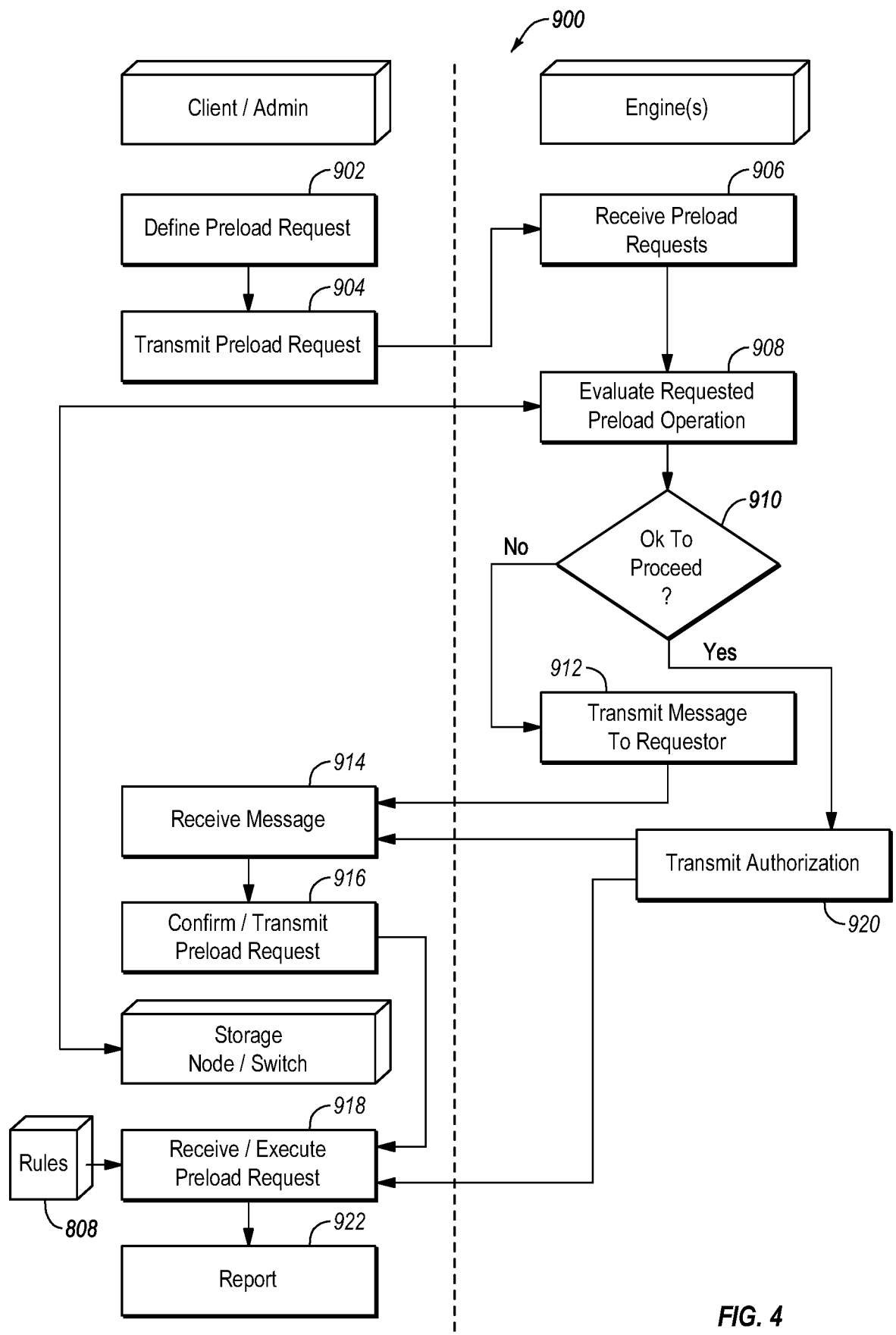
FIG. 4 is a flow diagram of an example method for defining and servicing a data request.

With reference now to FIG. 4, and continuing reference to FIG. 3, details are provided concerning methods for generating, evaluating, and executing a preload request. One example of such a method is denoted generally at 900. The method 900 can begin when a user or administrator defines 902 a preload request. The preload request may include, for example, the identification of the data desired to be preloaded, the amount of data to be preloaded, the source of that data, and the target destination for that data. The completed preload request can then be transmitted 904 from a client, administrator, or other entity to an engine, or engines, for further processing. In some embodiments, the engines include a capacity engine. The engine(s) can reside at a server such as server 502 for example.

After receipt 906 of the preload request, the engine then evaluates 908 the requested preload operations and/or operations implicated by the data preload request. Where the engine includes a capacity engine, the evaluation of the data preload request may comprise an evaluation of available cache capacity in view of the requested data preload operation. This evaluation can involve communication between and among the engine(s), storage node, core fabric and core switches. For example, an engine may query a core switch, or core switches, to determine an available cache capacity. Additionally, the engine may query the storage node to determine how much data is implicated by the preload request, if that information has not already been identified in the data preload request.

With the available cache capacity information and the data information, the engine can then make a determination 910 as to whether or not the preload request should be carried out or not. The determination 910 made by the engine may be as simple as comparing available cache capacity at a switch, or switches, with the amount of data requested to be preloaded. In some instances, this determination 910 can be advisory only in nature, and the preload request may be carried out notwithstanding a contrary determination by the engine. In other instances, the determination 910 may be binding in nature and thus prevent execution of the preload request.

In any case, various actions can be taken after the determination 910 has been made. For example, the engine may transmit 912 a message to the requestor, such as a client or administrator for example, indicating that the evaluation 908 revealed a lack of adequate cache capacity for the requested preload operation, and also indicating that the requested preload operation cannot, or should not, be performed. This message is then received 914 by the requestor. If the message is advisory only in nature, the requestor can confirm and transmit the preload request 916, notwithstanding that the message may have indicated that the requested preload operation should not be performed for some reason. Similarly, if the message indicates that there is adequate cache capacity to support the requested preload operation, the requestor can confirm and transmit the preload request 916.

In either of the aforementioned scenarios, the preload request is received 918 by a storage node and/or switch, such as a core switch. The storage node and switch can cooperatively execute the preload request. In some embodiments, execution of the preload request can be performed solely by the switch, or solely by the storage node. In either case, execution of the preload request can be performed in accordance with a set of one or more rules 808, examples of which are discussed above in connection with FIG. 3.

With continued reference to FIG. 4, if a determination 910 is made that the preload request should be carried out, an authorization message is transmitted 920 to the requestor, such as by way of a server for example. The requestor, which can be a client such as the clients of FIG. 1*b*, can then confirm and transmit the preload request 916 as discussed above. In one alternative embodiment, the authorization message can be transmitted 920 directly to the storage node and/or switch, bypassing the requestor. In this latter case, a further message can be transmitted to the requestor indicating that the requested preload operation will be performed.

Finally, after the preload request has been executed, the storage node and/or switch may report 922 to the requestor and/or other entities indicating that the operation(s) identified or implicated by the preload request have been completed. In some embodiments, the storage node and/or switch may provide ongoing status reports 922 to one or more entities which indicate the status and progress of the preload operation.

D. Example Methods—Servicing Data Requests

Figure 5:
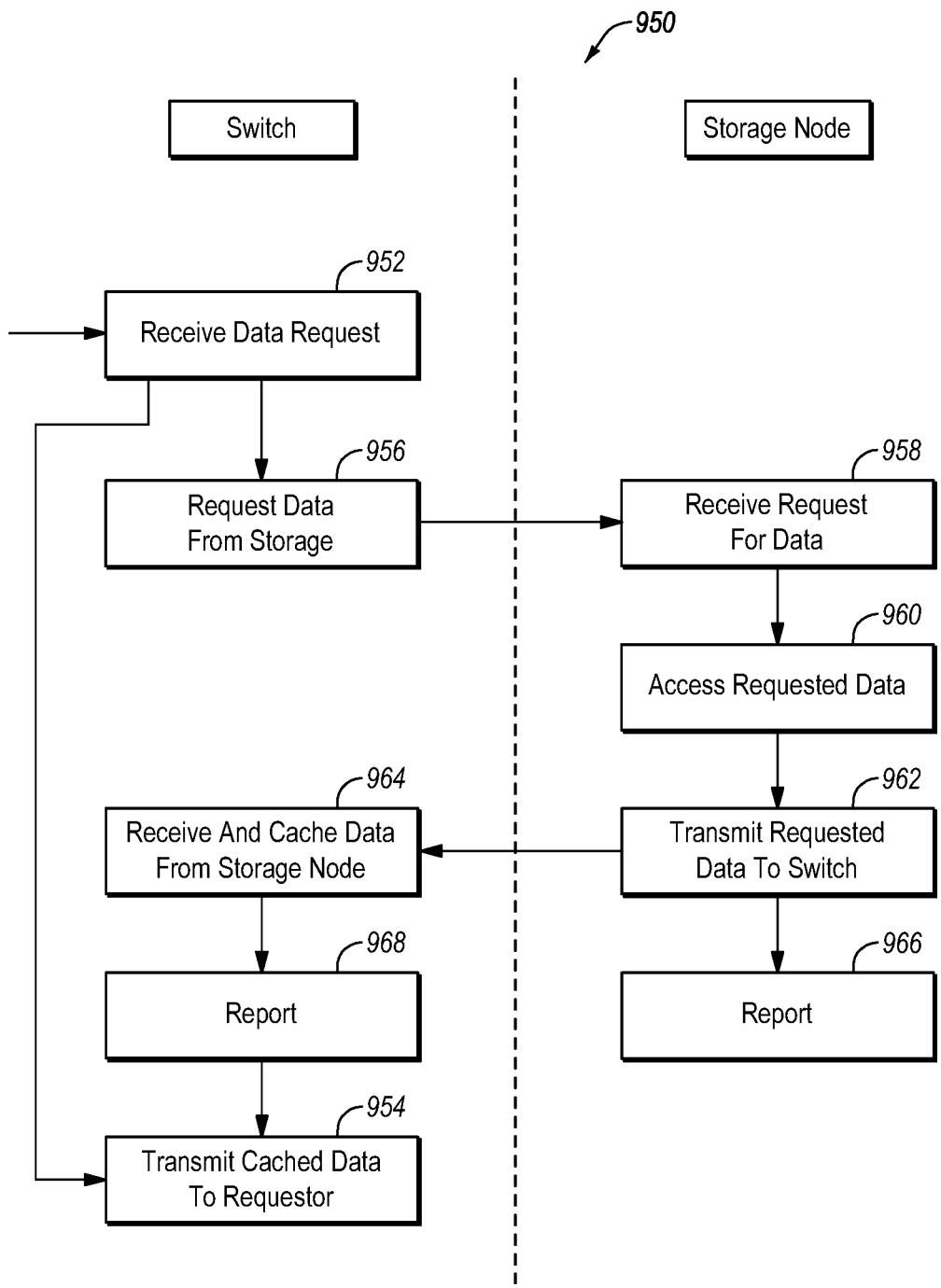
FIG. 5 is a flow diagram of an example method for storing data at, and retrieving data from, a switch.

Turning now to FIG. 5, details are provided concerning some processes relating to storage of data in a cache of a switch. One example of such a process is denoted generally at 950. Initially, a switch such as a core switch may receive 952 a data request. The requested data may, or may not, be already present in the cache of the switch. If so, the requested data is retrieved from the cache and transmitted 954 to the requestor. Because, in this example, the requested data is already present in the cache, subsequent requests for that data can be serviced at the switch.

In other embodiments, data can be pushed from the storage node to the switch before the switch receives 956 a data request. In such embodiments, there is no need for the switch to request 956 data from the storage node. This data push can be performed in response to a command from an administrator or other user. Some example methods for preloading data are discussed above in connection with FIG. 3.

In still other embodiments, the data identified in the data request is obtained and loaded into the cache at the switch on-demand. This circumstance may occur, for example, when data requested by the user is not yet present in the cache at the switch. In one such embodiment, the data requested by the user is read 956 by the switch from the storage node.

The storage node receives 958 the request for data stored at the storage node and accesses 960 the requested data. In some embodiments at least, the storage node may be a cloud storage node and/or cloud storage service, although that is not required. Once the requested data has been accessed and retrieved 960, that data is then transmitted 962 from the storage node to the requesting switch, where the data is received and cached 964 in cache memory at the switch. Upon transmission of requested data to the switch, the storage node may generate and transmit 966 a report indicating that the data has been sent, and indicating the destination(s) of the data. The report can be sent to the destination switch, an administrator, and/or any other entity or entities.

In similar fashion, the switch may generate and transmit 968 a report indicating that the data has been stored at the switch, the size of the data, the particular node in the switch where the data is stored, the type of data and/or any other parameters relating to the data cached at the switch. Then, the cached data received from the storage node is transmitted 954 from the switch to the requestor. In some instances, this process involves transmission of the requested cached data to a client by way of a server.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, switch, server, database, or storage node may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A switch, comprising:
   one or more hardware processors;
   a card slot;
   a cache memory node configured to physically engage the card slot, wherein the cache memory node includes cache memory and a physical network interface in communication with the cache memory, and the physical network interface is configured to connect to a mating optical fiber connector or a mating copper wire connector, and a configuration of the physical network interface corresponds to a network communications standard;
   one or more storage node connection ports in communication with the cache memory node;
   one or more client communication ports in communication with the cache memory node; and
   a non-transitory storage medium having stored therein instructions which are executable by the one or more hardware processors to perform operations comprising:
      receiving requested data from a data storage node;
      transferring the data received from the data storage node to the cache memory of the switch;
      receiving a request for the data stored in the cache memory; and
      transferring the data stored in the cache memory directly from the cache memory node to a requestor such that the data does not pass through any network interfaces external to the switch as the data travels between the switch and the requestor, wherein the requested data is transferred to cache memory either before, or after, receipt of the request for that data.

2. The switch as recited in claim 1, wherein the card slot is connected to one of the storage node connection ports.

3. The switch as recited in claim 1, wherein a connection between the card slot and the one of the storage node connection port supports data transfer rates equal to or greater than about 1 terabit/second.

4. The switch as recited in claim 1, wherein one of the client communication ports is a 10 GB Ethernet communication port.

5. The switch as recited in claim 1, wherein the cache memory comprises Random Access Memory (RAM).

6. The switch as recited in claim 1, wherein the cache memory comprises about 256 G or more RAM.

7. The switch as recited in claim 1, wherein the switch is a network core switch.

8. The switch as recited in claim 1, wherein the transferred data is pushed from the data storage node to the switch.

9. The switch as recited in claim 1, wherein the transferred data is pulled from the data storage node by the switch.

10. The switch as recited in claim 1, wherein identification of the data received from the data storage node is performed by the data requestor.

11. The switch as recited in claim 1, wherein additional data is stored in the cache memory prior to receipt, at the switch, of a request for the additional data.

12. The switch as recited in claim 1, wherein the data transferred from the cache memory is stored in the cache memory no more than once.

\* \* \* \* \*